US010568167B2

(12) United States Patent
Kajino et al.

(10) Patent No.: US 10,568,167 B2
(45) Date of Patent: Feb. 18, 2020

(54) HEAT TREATMENT APPARATUS

(71) Applicant: NETUREN CO., LTD., Tokyo (JP)

(72) Inventors: Yoshimasa Kajino, Tokyo (JP); Tatsushi Kida, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 1021 days.

(21) Appl. No.: 14/965,170

(22) Filed: Dec. 10, 2015

(65) Prior Publication Data

US 2016/0174300 A1 Jun. 16, 2016

(30) Foreign Application Priority Data

Dec. 11, 2014 (JP) ................................. 2014-250770

(51) Int. Cl.

| | |
|---|---|
| ***H05B 6/10*** | (2006.01) |
| ***B23Q 11/00*** | (2006.01) |
| ***A23N 7/02*** | (2006.01) |
| ***H05B 6/06*** | (2006.01) |

(52) U.S. Cl.

CPC ............... *H05B 6/102* (2013.01); *H05B 6/06* (2013.01)

(58) Field of Classification Search

CPC .................................. H05B 6/102; H05B 6/06

USPC ....... 219/644, 632, 672, 676, 650, 639, 658; 266/123, 127, 129, 25, 89, 125, 134, 103; 82/1.11, 130, 131, 149, 901; 148/570, 148/571, 641; 409/131, 137; 426/637; 134/105

See application file for complete search history.

(56) References Cited

U.S. PATENT DOCUMENTS

| | | | | |
|---|---|---|---|---|
| 5,205,686 A * | 4/1993 | de Caussin | ........ | B23Q 11/0057 29/DIG. 102 |
| 2009/0033008 A1* | 2/2009 | Kokudai | .................. | C21D 1/10 266/99 |
| 2014/0251391 A1* | 9/2014 | Chang | .................... | C21D 1/667 134/105 |
| 2017/0016082 A1* | 1/2017 | Xue | ......................... | C21D 9/08 |

FOREIGN PATENT DOCUMENTS

| | | |
|---|---|---|
| CN | 103418866 A * | 12/2013 |
| JP | 2012-031464 | 2/2012 |
| SU | 1717305 A1 * | 3/1992 |

* cited by examiner

*Primary Examiner* — Quang T Van
(74) *Attorney, Agent, or Firm* — Wenderoth, Lind & Ponack, L.L.P.

(57) ABSTRACT

A heat treatment apparatus is configured to perform a heat treatment on a workpiece while rotating the workpiece. The heat treatment apparatus includes a rotary shaft configured to support the workpiece and on which a discharge nozzle is provided to spray cooling liquid toward the workpiece, a fixing base having a supply port and a discharge port for the cooling liquid, a coupling section coupling the fixing base and the rotary shaft to each other in a relatively rotatable manner, and a detector configured to detect a flow of the cooling liquid discharged from the discharge port. A supply passage and a discharge passage are formed inside the fixing base, the rotary shaft and the coupling section. The supply passage extends from the supply port and to the discharge nozzle. The discharge passage branches from the supply passage inside the rotary shaft and leads to the discharge port.

6 Claims, 4 Drawing Sheets

HEAT TREATMENT APPARATUS

CROSS-REFERENCE TO RELATED APPLICATION

The present application claims priority from Japanese Patent Application No. 2014-250770 filed on Dec. 11, 2014, the entire content of which is incorporated herein by reference.

FIELD OF INVENTION

The present invention relates to a heat treatment apparatus.

BACKGROUND

When applying induction heating to a workpiece having a rotation axis, the workpiece is heated by induction heating while being rotated around the rotation axis so as to uniformly heat the workpiece. Induction heating equipments are generally small in size and are capable of high-speed heating with excellent repeatability, and therefore are suitable for incorporation in a manufacturing line and automation.

A related art heat treatment apparatus is configured to apply quenching on an outer peripheral surface of a workpiece, a cam portion of a cam shaft, while rotating the cam shaft (see, .e.g., JP2012-31464A), and induction heating and cooling of the workpiece are automated. In quenching, cooling of the workpiece affects the quenching quality. Accordingly, in the related art heat treatment apparatus, cooling liquid sprayed to the workpiece is collected, and based on presence or absence of a flow of the collected cooling liquid or the flow rate of the collected cooling liquid, whether the cooling liquid has been properly sprayed is detected.

FIG. 4 shows a configuration of an example of a heat treatment apparatus for performing induction heating on a hub ring as a workpiece having a rotation axis.

A heat treatment apparatus 101 shown in FIG. 4 includes a pair of support portions 103*a*, 103*b* and a heating coil 105. The support portions 103*a*, 103*b* support opposite axial end portions of a hub ring 102 and can be driven to rotate. A shaft portion 104 of the hub ring 102 is inserted into the heating coil 105. Induction heating is performed on the outer peripheral surface of the shaft portion 104 while rotating the hub ring 102.

The support portion 103*b* supporting an end portion of the hub ring 102 on the side of a flange 106 includes a rotary shaft 108 and a fixing base 110. A discharge nozzle 107 for spraying cooling liquid to the end portion on the flange 106 side is provided in the rotary shaft 108, which supports the hub ring 102. The fixing base 110 is coupled to the rotary shaft 108 via a rotary joint 109. A cooling liquid supply source is connected to the fixing base 110.

During the heating of the shaft portion 104, the cooling liquid is supplied inside the fixing base 110 and the rotary joint 109 and then inside the rotary shaft 108. The supplied cooling liquid is sprayed from the discharge nozzle 107 toward the end portion of the hub ring 102 on a side of the flange 106. Thus, it is suppressed that parts on which heat treatment is not required (for example, the end portion on the flange 106 side, the flange 106, etc.) may be also heated and increased in temperature to change their physical properties.

Here, when there arises such a trouble that the rotary joint 109 as a movable portion falls off, the cooling liquid cannot be supplied to the rotary shaft 108 on the downstream of the rotary joint 109 along a supply passage of the cooling liquid. Thus, there may arises an event that the cooling liquid cannot be properly sprayed.

Also with the heat treatment apparatus 101 having the configuration described above, the sprayed cooling liquid can be collected and whether the cooling liquid has been properly sprayed can be detected based on presence or absence of a flow of the collected cooling liquid or the flow rate of the collected cooling liquid However, in order to collect the cooling liquid in a reliable manner, the discharge nozzle 107 and the hub ring 102 may need to be surrounded with a housing to suppress scattering of the cooling liquid, and this may cause a trouble in carrying the hub ring 102 in or out.

If a detection is made as to the presence or the absence of a flow of the cooling liquid or the flow rate cooling liquid inside the rotary shaft 108 at a location downstream of the rotary joint 109, the housing for collecting the sprayed cooling liquid can be omitted. However, it is difficult to provide a detector to the rotary shaft 108 to be rotated.

SUMMARY

Illustrative aspects of the present invention provide a heat treatment apparatus capable of detecting a proper spraying of cooling liquid from a discharge nozzle with a simple configuration.

According to an illustrative aspect of the present invention, a heat treatment apparatus is configured to perform a heat treatment on a workpiece while rotating the workpiece. The heat treatment apparatus includes a rotary shaft configured to support the workpiece and on which a discharge nozzle is provided to spray cooling liquid toward the workpiece, a fixing base having a supply port and a discharge port for the cooling liquid, a coupling section coupling the fixing base and the rotary shaft to each other in a relatively rotatable manner, and a detector configured to detect a flow of the cooling liquid discharged from the discharge port. A supply passage and a discharge passage are formed inside the fixing base, the rotary shaft and the coupling section. The supply passage extends from the supply port and to the discharge nozzle. The discharge passage branches from the supply passage inside the rotary shaft and leads to the discharge port.

Other aspects and advantages of the invention will be apparent from the following description, the drawings and the claims.

DETAILED DESCRIPTION

Figure 1:
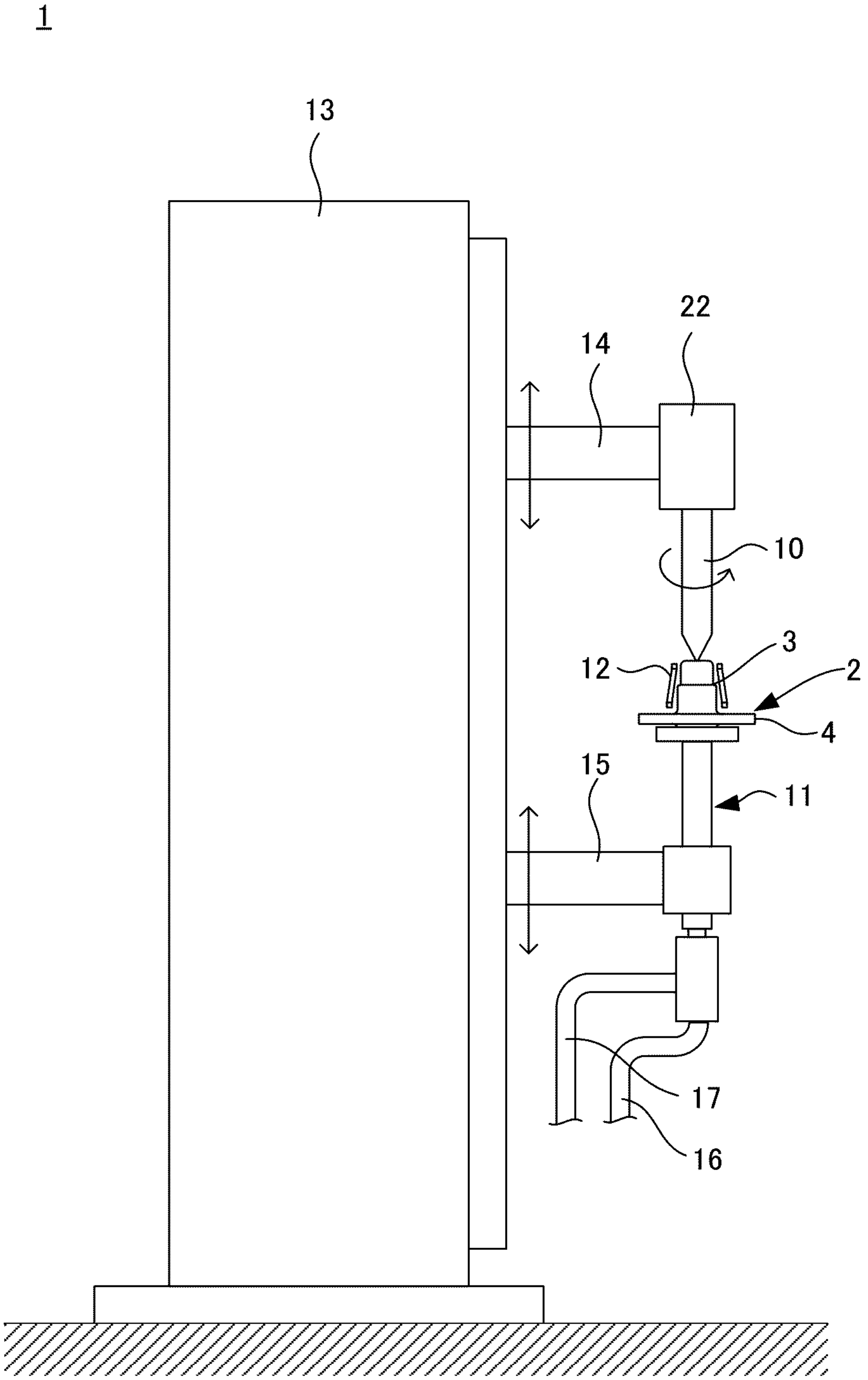
FIG. 1 is schematic view illustrating a configuration of an example of a heat treatment apparatus according to an exemplary embodiment of the present invention.
Figure 2:
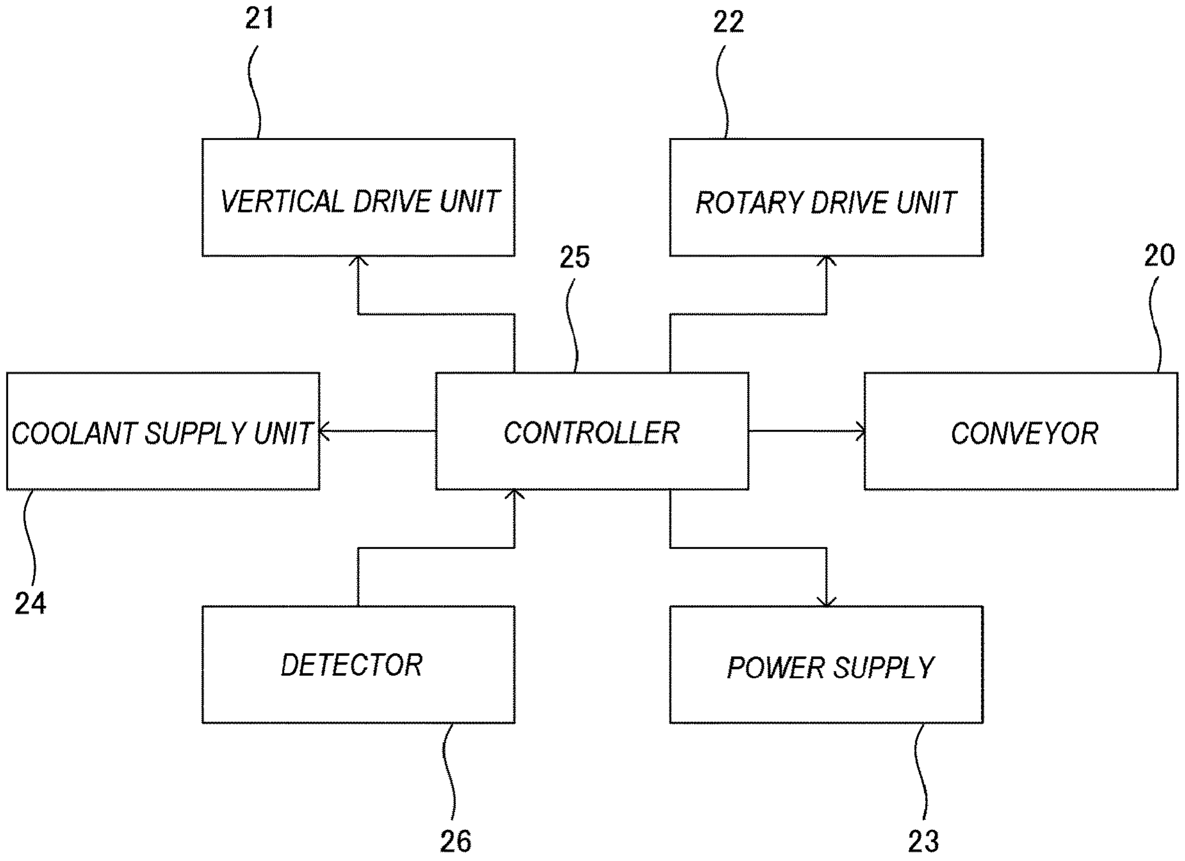
FIG. 2 is a block diagram illustrating a configuration of the heat treatment apparatus of FIG. 1.

FIGS. 1 and 2 illustrate a configuration of an example of a heat treatment apparatus 1 according to an exemplary embodiment of the present invention.

The heat treatment apparatus 1 is configured to perform a heat treatment on a hub ring 2, which is used to rotatably support a wheel of a vehicle such as an automobile.

The hub ring 2 has a one-piece structure including a cylindrical shaft portion 3 and a flange 4 provided on one end portion of the shaft portion 3 and to which a vehicle wheel is attached. A rolling surface of a rolling element such as a ball or a roller is formed in the outer peripheral surface of the shaft portion 3. The outer peripheral surface of the shaft portion 3 where the rolling surface has been formed is induction-heated by the heat treatment apparatus 1.

The heat treatment apparatus 1 has a conveyor 20 configured to carry in the hub ring 2 that has not yet been subjected to heat treatment and to carry out the bub ring 2 that has been subjected to heat treatment. In the heat treatment apparatus 1, a series of steps of carrying-in, heat treatment, and carrying-out of each hub ring 2 are automated. The heat treatment is performed on hub rings 2 sequentially.

The heat treatment apparatus 1 has a pair of support portions 10, 11 and a heating coil 12. The support portions 10, 11 support opposite axial end portions of the hub ring 2 that has been carried in by the conveyor 20. The heating coil 12 performs induction heating on the outer peripheral surface of the shaft portion 3 of the hub ring 2 supported by the pair of support portions 10, 11.

The support portion 10 is rotatably supported by an arm 14 extending from an apparatus body 13, and the support portion 11 is rotatably supported by an arm 15 extending from the apparatus body 13. The support portions 10, 11 are driven and moved up/down together with the arms 14 and 15 by a vertical drive unit 21 provided in the apparatus body 13.

When the hub ring 2 is carried in, the support portion 10 is moved down to abut against a distal end portion of the shaft portion 3 of the hub ring 2, and the support portion 11 is moved up to abut against the end portion of the hub ring 2 on a side of the flange 4. Thus, the hub ring 2 is held axially between the pair of support portions 10, 11. Then the support portions 10, 11 holding the hub ring 2 therebetween are moved up. The shaft portion 3 of the hub ring 2 is inserted into the heating coil 12 as the support portions 10, 11 are moved up.

In addition, the support portion 10 supporting the distal end portion of the shaft portion 3 of the hub ring 2 is driven and rotated by a rotary drive unit 22. With the rotation of the support portion 10, the support portion 11 holding the hub ring 2 with the support portion 10 and the ring 2 held between the pair of support portions 10, 11 are also rotated.

AC power from a power supply 23 is supplied to the heating coil 12 to which the shaft portion 3 of the hub ring 2 has been inserted. As soon as the AC power is supplied to the heating coil 12, a current flows, due to electromagnetic induction, into an outer peripheral surface (heating target portion) of the shaft portion 3 of the hub ring 2, which is located inside the heating coil 12 so as to face the coil 12. On that occasion, the support portion 10 is rotated and the hub ring 2 is also rotated so that the outer peripheral surface of the shaft portion 3 can be induction-heated uniformly.

When the outer peripheral surface of the shaft portion 3 is being induction-heated, cooling liquid is supplied from coolant supply unit 24 through a pipe 16 to the support portion 11 supporting the end portion of the hub ring 2 on the flange portion 4 side. The cooling liquid supplied to the support portion 11 is sprayed to the end portion on the flange 4 side. Thus, it is suppressed that parts on which heat treatment is not required (e.g., the end portion on the flange 4 side, the flange 4, etc.) may be also heated and increased in temperature to change their physical properties.

After the completion of the induction heating on the outer peripheral surface of the shaft portion 3, the electric power supply from the power supply 23 to the heating coil 12 is stopped. In addition, the support portions 10, 11 are moved down and the hub ring 2 is transferred onto the conveyor 20. After the hub ring 2 is transferred onto the conveyor 20, the support portion 10 is moved up while the support portion 11 is moved down. Thus, the hub ring 2 is released from the support portions 10, 11. Then the released hub ring 2 is carried out by the conveyor 20.

The operations of the conveyor 20 that carries in and out the hub ring 2, the vertical drive unit 21 that moves the support portions 10, 11 up and down, the rotary drive unit 22 that rotates the support portion 10, the power supply 23 that supplies electric power to the heating coil 12, and the coolant supply unit 24 that supplies the cooling liquid to the support portion 11 are controlled by a controller 25. Thus, a series of steps of carrying-in, heat treatment, and carrying-out of the hub ring 2 are automated.

The heat treatment apparatus 1 has a detector 26 to detect whether the cooling liquid supplied from the coolant supply unit 24 is properly sprayed from the support portion 11. Description will be made below with regard to the support portion 11 configured to spray the cooling liquid and the detector 26 configured to detect the spraying of the cooling liquid from the support portion 11.

Figure 3:
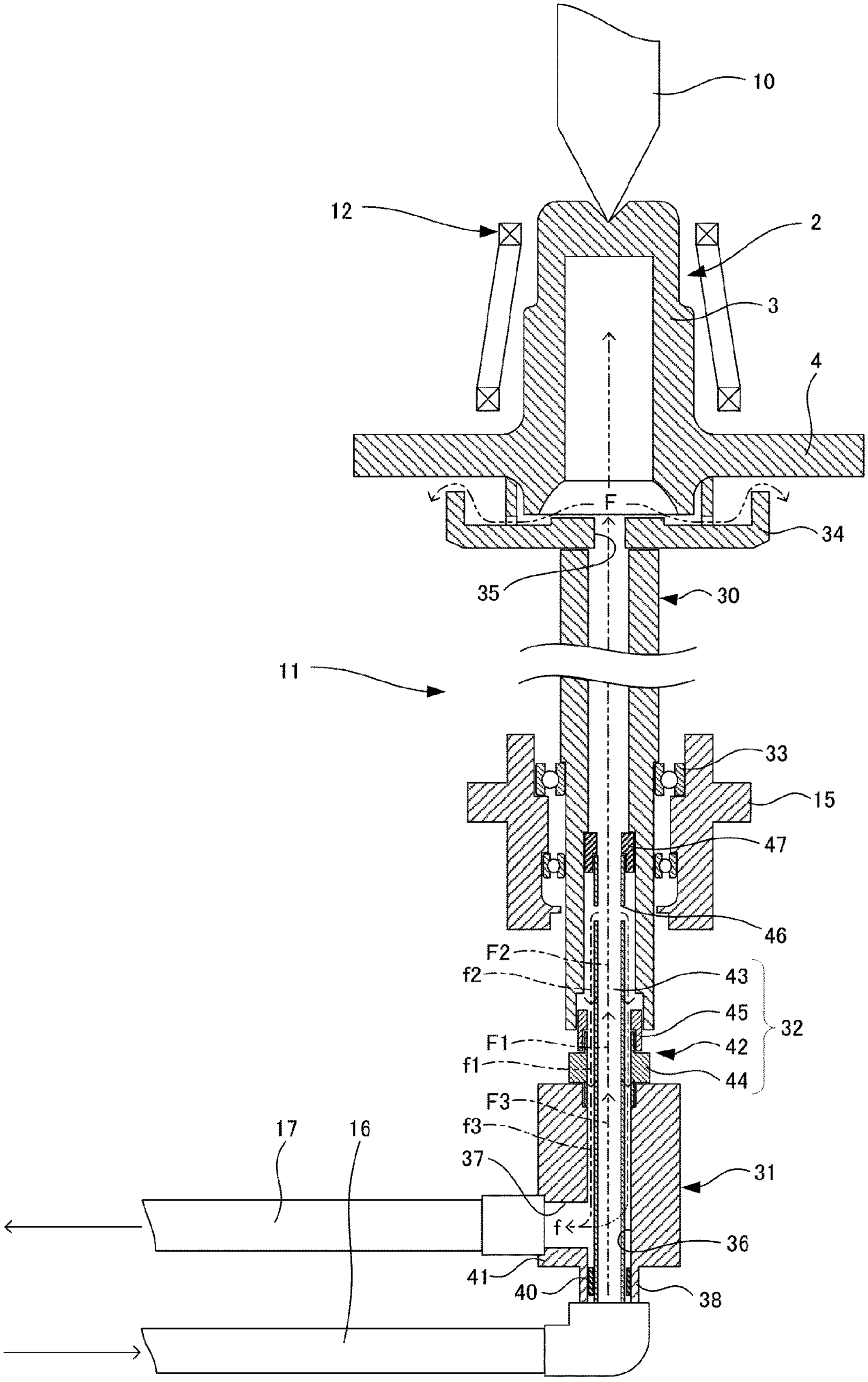
FIG. 3 is a schematic view illustrating a configuration of a support portion of the heat treatment apparatus of FIG. 1.
Figure 4:
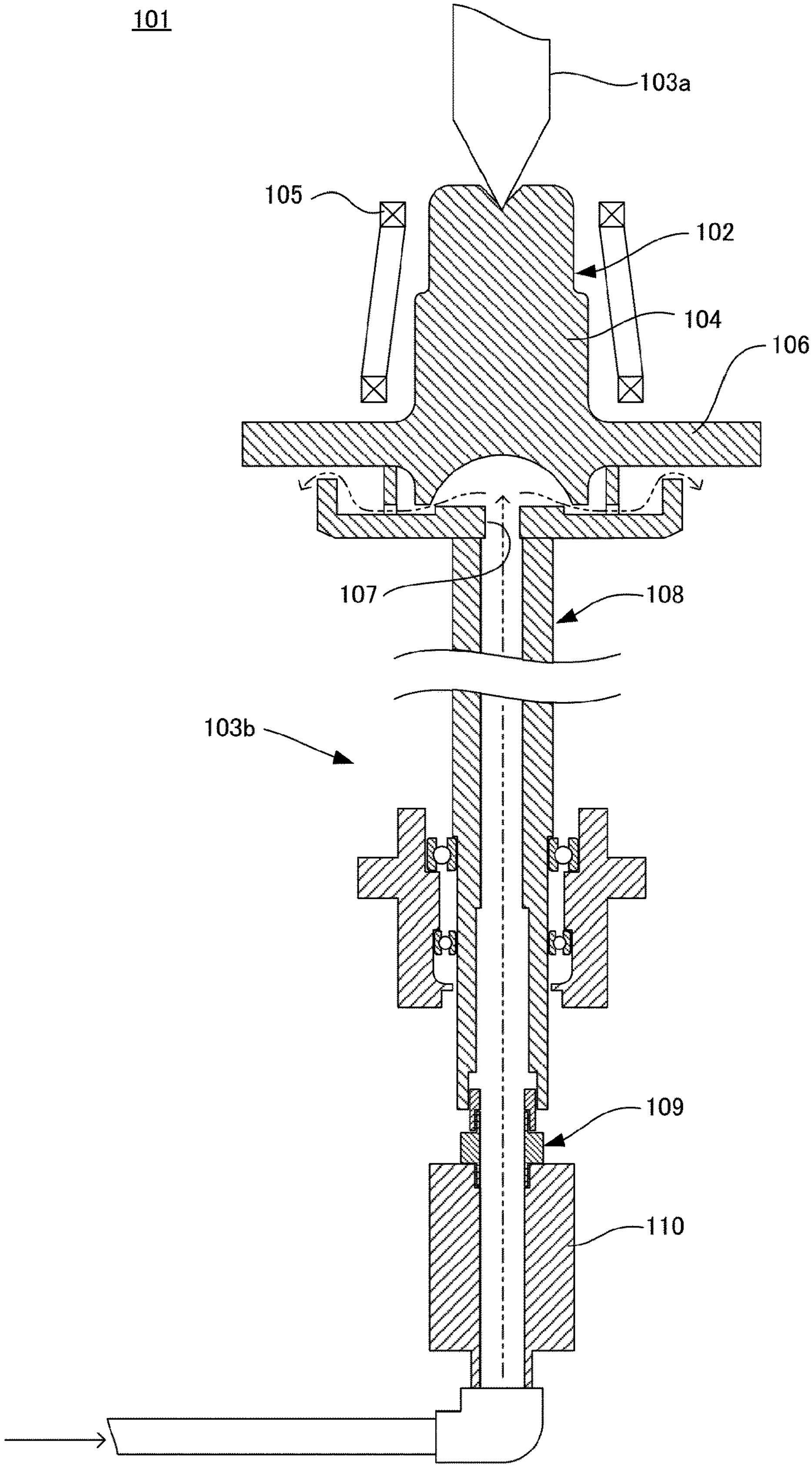
FIG. 4 is a schematic view illustrating a configuration of a heat treatment apparatus of a reference example.

FIG. 3 illustrates a configuration of the support portion 11.

The support portion 11 includes a rotary shaft 30, a fixing base 31, and a coupling section 32 coupling the rotary shaft 30 and the fixing base 31 to each other in a relatively rotatable manner.

The rotary shaft 30 is rotatably supported by the arm 15 via a bearing 33. The rotary shaft 30 is configured as a substantially circular cylindrical body. The interior of the rotary shaft 30 serves as a flow passage for the cooling liquid. A mounting portion 34 on which the end portion of the hub ring 2 on the flange 4 side is mounted is provided in one end portion of the rotary shaft 30. A discharge nozzle 35 communicating with the flow passage inside the rotary shaft 30 is provided in the mounting portion 34.

In the illustrated example, the shaft portion 3 of the hub ring 2 is hollow. The interior of the shaft portion 3 is filled with the cooling liquid sprayed from the discharge nozzle 35 so that the shaft portion 3 is cooled from its inner peripheral surface. Thus, a heating pattern in induction heating on the outer peripheral surface (a heating target portion) of the shaft portion 3 facing the heating coil 12 is adjusted. The shaft portion 3 of the hub ring 2 may not necessarily be hollow, and may be solid.

The fixing base 31 is coupled, via the coupling section 32, to the end portion of the rotary shaft 30 on a side opposite to the mounting portion 34. A through hole 36 and a lateral hole 37 are provided in the fixing base 31. The lateral hole 37 extends from the external surface of the fixing base 31 in a direction intersecting the central axis of the through hole 36 and reaches the through hole 36. The through hole 36 and the lateral hole 37 serve as flow passages for the cooling liquid.

One opening portion of the through hole 36 serves as a supply port 38 for the cooling liquid. The pipe 16 lead from the coolant supply unit 24 is connected to the supply port 38. A seal member 40 provided with an insertion hole is fitted to the supply unit 38. An opening portion of the lateral hole 37 serves as a discharge port 41 for the cooling liquid. A pipe 17 is connected to the discharge port 41. Due to rigidity of the pipes 16, 17, the fixing base 31 is prevented from rotating.

The coupling section 32 includes a rotary joint 42 and an inner pipe 43.

The rotary joint 42 includes a tubular inner member 44, and an outer member 45 rotatably fitted onto the inner member 44. The inner member 44 is fixed to the fixing base 31, and the outer member 45 is fixed to the rotary shaft 30, whereby the rotary shaft 30 and the fixing base 31 are coupled to each other in a relatively rotatable manner.

The interior of the rotary joint 42 formed by the tubular inner member 44 and the outer member 45 serves as a flow passage for the cooling liquid. The flow passage inside the fixing base 31 includes the through hole 36 and the lateral hole 37. The flow passage inside the fixing base 31 and the flow passage inside the rotary shaft 30 configured as a cylindrical body are connected to each other through the flow passage inside the rotary joint 42.

The inner pipe 43 is inserted into the rotary joint 42. The distal end portion of the inner pipe 43 is received inside the rotary shaft 30 and the base end portion of the inner pipe 43 is received in the through hole 36 of the fixing base 31. By the inserted inner pipe 43, the flow passage inside the rotary joint 42 is divided into a flow passage F1 inside the inner pipe 43 and a flow passage f1 outside the inner pipe 43.

At least one through hole 46 is formed through the peripheral wall of the inner pipe 43 at the distal end portion of the inner pipe 43 provided inside the rotary shaft 30. In addition, a seal member 47 such as a collar slidable between the rotary shaft 30 and the inner pipe 43 is provided at a location closer to the distal end of the inner pipe 43 than from the through hole 46. By the inner pipe 43 and the seal member 47, the flow passage inside the rotary shaft 30 is divided into a flow passage F2 inside the inner pipe 43 leading to the distal end of the inner pipe 43, and a flow passage f2 outside the inner pipe 43 and branching from the flow passage F2 at the through hole 46.

The base end portion of the inner pipe 43 received in the through hole 36 of the fixing base 31 is inserted into the insertion hole provided in the seal member 40. By the inner pipe 43 and the seal member 40, the flow passage inside the fixing base 31 is divided into a flow passage F3 inside the inner pipe 43 leading to the supply port 38, and a flow passage f3 outside the inner pipe 43 leading to the discharge port 41.

Inside the support portion 11 having the configuration described above, a supply passage F and a discharge passage f for the cooling liquid are formed. The supply passage F includes the flow passages F1, F2, F3, and extends from the supply port 38 to the discharge nozzle 35. The discharge passage f includes the flow passages f1, f2, f3, and is branched from the supply passage F inside the rotary shaft 30 and leads to the discharge port 41.

The cooling liquid supplied from the coolant supply unit 24 to the supply port 38 of the support portion 11 through the pipe 16 flows through the supply passage F and is sprayed from the discharge nozzle 35. During the course of flowing inside the supply passage F, a portion of the cooling liquid flows into the discharge passage f branching from the supply passage F, and is discharged from the discharge port 41 after passing through the discharge passage f.

Each of the supply passage F and the discharge passage f extends across the coupling section 32. When a trouble occurs in the coupling section 32 including movable portions, the cooling liquid is not supplied to the rotary shaft 30 side on the downstream of the coupling section 32 in the supply passage F extending across the coupling section 32, or the flow rate of the cooling liquid supplied to the rotary shaft 30 side is reduced. In such a case, also in the discharge passage f, the cooling liquid does not flow toward the fixing base 31 on the downstream of the coupling section 32, or the flow rate of the cooling liquid flowing toward the fixing base 31 is reduced.

Therefore, the detector 26 detects presence/absence of a flow of the cooling liquid discharged from the discharge port 41 located on a side of the fixing base 31, downstream of the coupling section 32 in the discharge passage f. Thus, it can be detected whether the cooling liquid supplied from the coolant supply unit 24 is supplied to the rotary shaft 30 side on the downstream of the coupling section 32 in the supply passage F properly or not, that is, whether the cooling liquid is properly sprayed from the discharge nozzle 35.

The presence or absence of a flow of the cooling liquid discharged from the discharge port 41 can be detected, for example, using a flow switch. The flow switch may be provided in the discharge port 41 or the pipe 17 connected to the discharge port 17.

The detector 26 may be configured to detect the flow rate of the cooling liquid discharged from the discharge port 41. The flow rate of the cooling liquid flowing into the discharge passage f from the supply passage F keeps a substantially constant ratio to the flow rate of the cooling liquid supplied from the coolant supply unit 24. When the flow rate of the cooling liquid discharged from the discharge port 41 is detected, the flow rate of the cooling liquid sprayed from the discharge nozzle 35 can be grasped. Thus, whether the cooling liquid is properly sprayed from the discharge nozzle 35 can be detected more in detail.

The discharge passage f is branched from the supply passage F inside the rotary shaft 30, and the cooling liquid that has not been sprayed from the discharge nozzle 35 flows into the discharge passage f The detection as to whether the cooling liquid is properly sprayed from the discharge nozzle 35 based on the flow of the cooling liquid discharged from the discharge port 41. Therefore, it is not necessary to collect the cooling liquid sprayed from the discharge nozzle 35, or to provide a housing for collecting the cooling liquid.

Reference is made to FIG. 2. At the timing when the cooling liquid is supplied from the coolant supply unit 24, based on the result of detection by the detector 26, the controller 25 determines that the cooling liquid is not properly sprayed from the discharge nozzle 35 when the cooling liquid flows into the discharge port 41 or the flow rate of the cooling liquid discharged from the discharge port 41 is not lower than a threshold, and determines that the cooling liquid is not properly sprayed from the discharge nozzle 35 when the cooling liquid does not flow into the discharge port 41 or the flow rate of the cooling liquid discharged from the discharge port 41 is lower than the threshold. The threshold can be set suitably in accordance with the flow rate of the cooling liquid supplied from the coolant supply unit 24.

When the controller 25 determines that the cooling liquid is properly being sprayed from the discharge nozzle 35, the controller 25 continues the series of steps of carrying-in, heat treatment, and carrying-out of the hub ring 2. When the controller 25 determines that the cooling liquid is not properly being sprayed from the discharge nozzle 35, the controller 25 stops the steps. Instead of or in addition to continuing and/or stopping the steps, the controller 25 may issue and alarm or the like to notify an operator.

As described above, according to one or more exemplary embodiments of the present invention, a heat treatment apparatus is configured to perform a heat treatment on a workpiece while rotating the workpiece. The heat treatment apparatus includes a rotary shaft configured to support the workpiece and on which a discharge nozzle is provided to spray cooling liquid toward the workpiece, a fixing base having a supply port and a discharge port for the cooling liquid, a coupling section coupling the fixing base and the rotary shaft to each other in a relatively rotatable manner, and a detector configured to detect a flow of the cooling liquid discharged from the discharge port. A supply passage and a discharge passage are formed inside the fixing base, the rotary shaft and the coupling section. The supply passage extends from the supply port and to the discharge nozzle. The discharge passage branches from the supply passage inside the rotary shaft and leads to the discharge port.

The detector may be configured to detect a flow rate of the cooling liquid discharged from the discharge port.

The rotary shaft may be configured as a cylindrical body, and the coupling section may include a rotary joint coupling the rotary shaft and the fixing base to each other and having a flow passage leading into the rotary shaft, and an inner pipe inserted into the flow passage of the rotary joint and having an end portion inserted into the rotary shaft. The end portion of the inner pipe has at least one through hole formed through a peripheral wall of the inner pipe, and is provided with a seal member slidable between the rotary shaft and the inner pipe at a location closer to a distal end of the inner pipe than from the through hole.

The flow passage of the rotary joint leads to the discharge port, and the inner pipe leads to the supply port.

The heat treatment apparatus may further include a controller configured to continue or to stop the heat treatment based on a result of a detection by the detector.

The cooling liquid may be sprayed, when the workpiece is being heated, from the discharge nozzle toward a portion of the workpiece other than a heating target portion of the workpiece.

While the present invention has been described with reference to a certain exemplary embodiment thereof, the scope of the present invention is not limited to the exemplary embodiment described above, and it will be understood by those skilled in the art that various changes and modifications may be made therein without departing from the scope of the present invention as defined by the appended claims.

What is claimed is:

1. A heat treatment apparatus configured to perform a heat treatment on a workpiece while rotating the workpiece, the heat treatment apparatus comprising:

a rotary shaft configured to support the workpiece and on which a discharge nozzle is provided to spray cooling liquid toward the workpiece;

a fixing base having a supply port and a discharge port for the cooling liquid;

a coupling section coupling the fixing base and the rotary shaft to each other in a relatively rotatable manner;

a detector configured to detect a flow of the cooling liquid discharged from the discharge port; and a heating coil, wherein a supply passage and a discharge passage are formed inside the fixing base, the rotary shaft and the coupling section, the supply passage extending from the supply port to the discharge nozzle, and the discharge passage branching from the supply passage inside the rotary shaft and leading to the discharge port.

2. The heat treatment apparatus according to claim 1, wherein the detector is configured to detect a flow rate of the cooling liquid discharged from the discharge port.

3. The heat treatment apparatus according to claim 1, wherein the rotary shaft is made of a cylinder, wherein the coupling section comprises a rotary joint coupling the rotary shaft and the fixing base to each other and having, inside the rotary joint, a flow passage leading into the rotary shaft, and an inner pipe inserted into the flow passage of the rotary joint and having end portion inserted into the rotary shaft, and wherein the end portion of the inner pipe has at least one through hole formed through a peripheral wall of the inner pipe, and is provided with a seal member slidable between the rotary shaft and the inner pipe at a location closer to a distal end of the inner pipe than from the through hole.

4. The heat treatment apparatus according to claim 3, wherein the flow passage of the rotary joint leads to the discharge port, and the inner pipe leads to the supply port.

5. The heat treatment apparatus according to claim 1, further comprising a controller configured to continue or to stop the heat treatment based on a result of a detection by the detector.

6. The heat treatment apparatus according to claim 1, wherein the cooling liquid is sprayed, when the workpiece is being heated by the heating coil, from the discharge nozzle toward a portion of the workpiece other than a heating target portion of the workpiece.

* * * * *